April 23, 1946.    J. W. MILLINGTON    2,398,800
ELECTRICAL PROSPECTING METHOD AND APPARATUS
Filed July 6, 1940    2 Sheets-Sheet 1

WITNESS:

INVENTOR
John W. Millington
BY
ATTORNEYS.

April 23, 1946.   J. W. MILLINGTON   2,398,800
ELECTRICAL PROSPECTING METHOD AND APPARATUS
Filed July 6, 1940   2 Sheets-Sheet 2

WITNESS:

INVENTOR
John W. Millington
BY
Busser + Harding
ATTORNEYS.

Patented Apr. 23, 1946

2,398,800

UNITED STATES PATENT OFFICE 2,398,800

ELECTRICAL PROSPECTING METHOD AND APPARATUS

John W. Millington, Beaumont, Tex., assignor to Sperry-Sun Well Surveying Company, Philadelphia, Pa., a corporation of Delaware Application July 6, 1940, Serial No. 344,227

12 Claims. (Cl. 175—182)

This invention relates to geophysical prospecting and more particularly, by so-called electrical coring, to the determination of the nature and boundaries of formations traversed by bore holes.

In the patent to Bazzoni & Razek No. 2,167,630, dated August 1, 1939, there is described a method and apparatus for electrical prospecting, the method involving lowering into a bore hole an apparatus arranged to propagate high frequency oscillations into the strata surrounding the apparatus. By causing the oscillation producing apparatus to be affected by the strata in its vicinity, a measurement of the electrical conditions of the apparatus will give an indication of the formations which are encountered. Instead of having the oscillation producing apparatus affected by the field it produces, a separate detecting means may be provided to record, for example, the intensity of the field in a given location in the vicinity, thereby also securing an indication of the strata through which the apparatus is passing. The various matters to be taken into account are fully described in said patent and reference is made thereto for a more general description of the problems which arise.

In general in high frequency apparatus of the type disclosed in said patent the changes in operation of an oscillator or detector are relatively slight and amplification is generally desired either solely for operation of a recording apparatus or for transmission to a distant point and the operation of a recording apparatus. The changes which are measured may involve variations either in a direct current or in a high frequency alternating current. Direct current amplification is generally unsatisfactory and difficult due to variations in power supplies and to the necessity for separate power supplies in cascade. It is also difficult to amplify the high frequencies used in logging and particularly the ultra-high frequencies which are sometimes desirably used.

It is the broad object of the present invention to provide a logging apparatus and method in which amplification may be effected to any desired degree to magnify the variations occasioned by the changing properties of strata encountered in logging a hole. The invention is applicable particularly to high frequency logging, though, as will be evident, it may be applied to the amplification of results secured in logging a hole by direct currents or low frequency alternating currents.

Further objects of the invention relating, for example, to the making of multiple records and to details of construction, will be apparent from the following description read in conjunction with the accompanying drawings, in which.

In view of the fact that the apparatus is for the purposes illustrated in said Bazzoni and Razek patent and since a substantially similar arrangement of parts within a bore hole may be used, there are illustrated herein only such details of the invention as are necessary to understand it.

Figure 1:
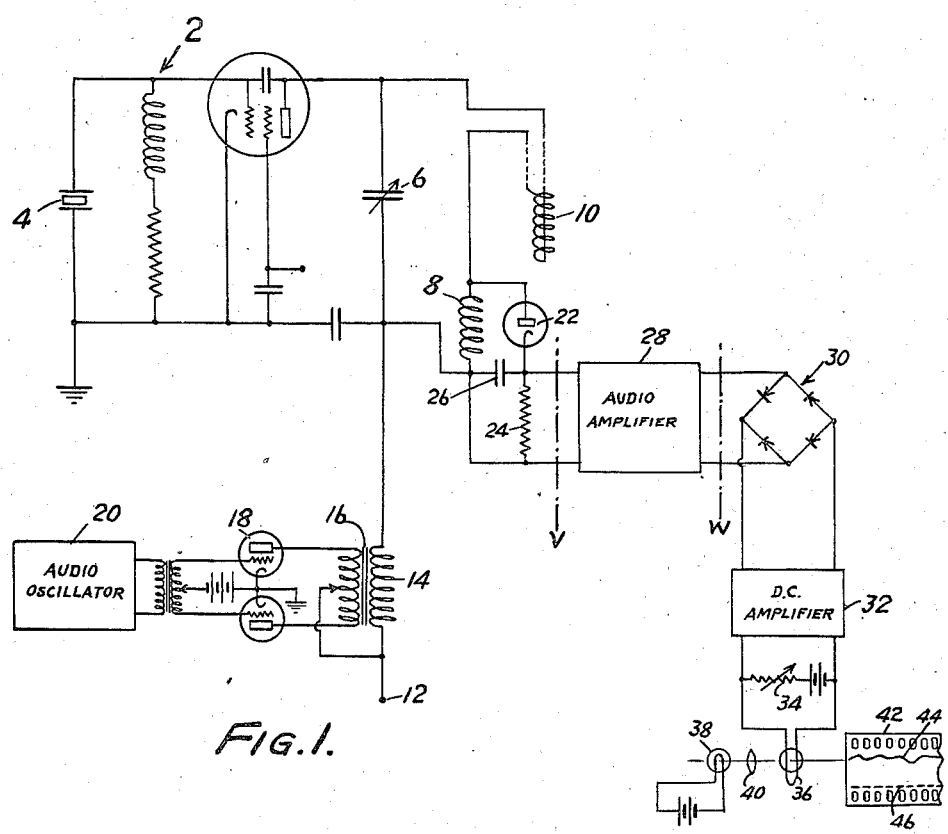
Figure 1 is a wiring diagram illustrating a preferred embodiment of the invention.

As illustrated in the Bazzoni and Razek patent, the apparatus including a high frequency generator, the recording apparatus and all desired parts may be included within a casing adapted to be lowered through the bore hole without electrical connection to the surface. Alternatively, however, only the generating and detecting apparatus may be located within the casing in the hole and signals transferred to recording apparatus at the surface. The power supplies for operation may be wholly within the hole, wholly at the surface or in part within the hole and in part at the surface. The possibility of these various arrangements will be apparent hereafter. For the sake of simplicity in description, however, it may be assumed that all of the apparatus in Figure 1 is located together with its power supplies within a casing adapted to be lowered within the hole by means of a cable or wire line which is not called upon to conduct any current.

At 2 there is illustrated a conventional form of constant frequency oscillator controlled by a crystal 4. This oscillator may comprise, for example, a conventional screen grid tube with a crystal in its grid circuit and having a tuned circuit connected to the plate and comprising two coils 8 and 10 in series shunted by an adjustable condenser 6. The coil 8 is located within the casing, while the coil 10, on the other hand, is the exploratory coil suitably located within or about an insulated nosepiece attached to the casing. As will be evident from said Bazzoni and Razek patent, the coil 10 may be replaced by an antenna arrangement, or the like, suitable for establishing a high frequency electromagnetic field, and accordingly currents, within the formations traversed by the hole. Desirably the coil 10 is so wound as to be of slight axial length so as to serve to detect quite thin formations.

In accordance with this invention plate current is supplied from a supply connected at 12 through the secondary 14 of a modulation transformer 16, the primary of which is connected to a push-pull amplifier 18, driven by an audio oscillator 20. This oscillator may be of any conventional construction and need not be described in detail. It should, however, be of the type adapted to supply a constant amplitude of audio output to the amplifier 18.

The modulating arrangement thus provided serves to modulate the oscillator in conventional fashion so that there flows in the tank circuit and in the surrounding strata a modulated high frequency current, the modulation being at the frequency of the audio oscillator. Inasmuch as the audio oscillator provides a constant output any variations in the modulated high frequency current will be due to variations in characteristics of the strata in which the high frequency field is established, the current in the tank circuit being dependent upon the surroundings of the coil 10, which cause the resonant frequency of the plate tank circuit to depart to variable extents from that of the crystal.

The coil 8 is shunted by a diode detector 22 in series with a resistance 24 shunted by a high frequency by-pass condenser 26. The detector thus provided produces across the resistance 24 an audio frequency voltage the amplitude of which is variable in accordance with the variations in effective impedance to the high frequency of the exploratory coil 10. The voltage across the resistance 24 may be amplified to any desired degree by means of a conventional audio amplifier indicated at 28. The audio frequency output of this amplifier is in turn rectified by the bridge rectifier arrangement indicated at 30, the output of which is fed to a direct current amplifier 32 arranged to suitably filter out the ripple resulting from rectification. This amplifier feeds direct current to a galvanometer 36 across which is shunted a bucking circuit comprising a battery and variable resistance 34, whereby the galvanometer may be properly adjusted to produce a record on the proper portion of a film 42 by reflection of a beam of light provided by a lamp 38 and lens system 40. The galvanometer is so arranged that by its movements it produces a wave trace indicated at 44 on the film. The variations in this trace correspond to the variations in the characteristics of the formations encountered by the exploratory coil 10. In order to correlate these variations with time, timing marks 46 may be provided on the film in the flashion indicated in said Bazzoni and Razek patent.

By use of the arrangement just described it will be evident that the difficulties of both high frequency and direct current amplification are avoided. The direct current amplification which is indicated need only be of single stage type and, of course, is accordingly quite simple and reliable. It may, in fact, be eliminated altogether provided the audio frequency amplification is carried out to the necessary extent and proper filtering introduced between the rectifier and the galvanometer 36. Or an alternating current galvanometer may be directly actuated by the output of amplifier 28, the parts to the right of the line W constituting, in effect, merely a rather elaborate and sensitive alternating current galvanometer.

This arrangement is particularly satisfactory if transmission of signals to the surface is to be effected. In such case members of the apparatus to the left of the line V may be within the casing in the bore hole connected by a transmission line to the apparatus to the right of the line V, which may be at the surface. Alternatively, amplification may occur in the bore hole in which case the transmission line would connect the members of the apparatus to the left and right of the line W. Since alternating signals are transmitted, the direct high voltage for operation of the oscillators in the hole may be transmitted along the same conductor or conductors used for the alternating current, separation being effected by suitable filtering.

The audio frequency used may lie within the conventional audio range or it may be within the supersonic range extending up to and including the lower, readily amplifiable radio frequencies, which range, it will be understood in the present case, is intended to be included in the reference to audio or low frequencies. Such frequencies, for example, in the range between about 200 cycles to 100,000 cycles may be very readily amplified in accordance with conventional practice, avoiding the difficulties of high radio frequency amplification or high direct current amplification. Frequencies in this range up to about 20,000 cycles are also readily transmitted by lines to the surface.

Instead of amplitude modulation, frequency modulation of the high frequency currents may be effected in which case demodulation must be effected by means of a suitable detector designed in accordance with common practice for reception of frequency modulated waves.

While there has been described and specifically illustrated in connection with Figure 1 the modulation of a high radio frequency, it will be evident that the invention is applicable to the amplification of the results of direct current or low frequency logging. In the case of direct current logging, using electrodes, for example, the direct voltage or current, which varies in accordance with the formations encountered, may be fed along with the constant amplitude audio frequency to a mixing tube, and the output of this tube, which will vary in amplitude in accordance with the direct current, may be amplified by means of an audio amplifier such as 28, the output being detected by the apparatus illustrated in Figure 1. If a low frequency of the order of 25 to 100 cycles is used for exploratory purposes (which frequencies are too low for effective high amplification except by complicated direct current amplifiers), the varying current of such frequency may be fed to a mixer, which also receives a constant amplitude high audio frequency. The resulting high audio frequency current, modulated at the low logging frequency, may be amplified to any desired degree and then demodulated, the low and high frequency components separated by filtering, and the low frequency components recorded by a suitable meter, for example, of a hot wire or thermocouple type. In the case of the use of low frequency for logging purposes, it is desirable that the audio frequency which is to be modulated and amplified be relatively high so that filtration of the demodulated components may be readily effected. Alternatively, the low frequency produced by the demodulation may be itself rectified and measurements made by the type of devices illustrated at 30, 32, 34 and 36.

Figure 2:
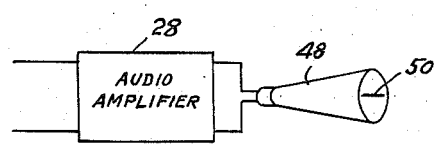
Figure 2 is a fragmentary diagram indicating, in part, an alternative recording arrangement.
Figure 3:
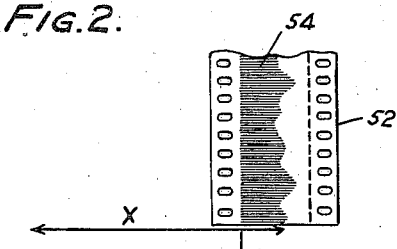
Figure 3 is a diagram illustrating the nature of the record made by the apparatus of Figure 2.

The recording apparatus following the audio amplification may be of various types of which one desirable form is partially illustrated in Figure 2, this being particularly adapted for surface recording. In this case the audio amplifier is connected to one pair of deflecting plates of a cathode ray oscillograph 48. There will then be produced a luminous line, such as indicated at 50, the length of which will correspond to the amplitude of the amplified audio frequency wave. This may be projected upon a moving film or such a film may be moved directly over the trace. Such a film, for example, is indicated at 52, on which at 54 there is indicated the exposure produced by one end of the trace 50. The entire length of the trace 50 need not be recorded but only that portion which is subject to variations. For example, the entire length of the trace may be as indicated at X, only the portions to the right of Y being recorded on the film. This may be effected by using a suitable opening through which the film is exposed. The record may be viewed directly or scanned by a conventional variable width sound track scanning apparatus.

Figure 4:
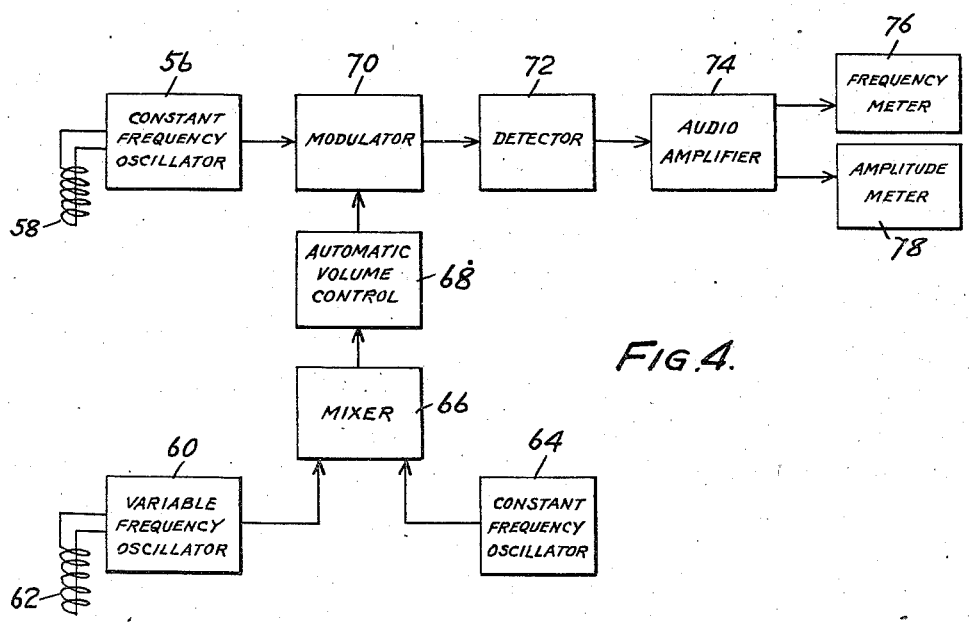
Figure 4 is a block diagram illustrating the application of the invention to the simultaneous securing of two logging records.

The invention may be applied to the simple transmission by a single conductor of the results of two different logging arrangements. For example, one logging arrangement may be of direct current type, while the other may be of high frequency type, or the two may be of widely different high frequencies; or, as pointed out below of substantially the same frequency. The type of arrangement involving different frequencies is specifically illustrated in Figure 4.

In this case there is provided at 56 a constant frequency oscillator which may be of the type illustrated in Figure 1 embodying an exploratory coil 58 in its tank circuit. This oscillator will accordingly have an output at the constant frequency but of varying amplitude.

Also located in the exploratory apparatus may be a variable frequency oscillator indicated at 60, which in turn has its own exploratory coil 62 suitably spaced from coil 58 in the hole so as to avoid interference with the latter. These coils will be located with some definite distance between them so that there will be a predetermined constant difference of depth between the strata which they respectively explore at any time. The variable frequency oscillator may be of any suitable type having a frequency which depends upon the impedance of the coil 62 which may be located in its plate or grid circuit. For example, it may be of the type illustrated in the patent to Pearson and Smith, number 2,271,951, dated February 3, 1942.

The frequencies of the oscillators 56 and 60 may be widely different, for example, one may be operated in the ultra-high frequency range and the other in the broadcast range. The two oscillators accordingly may be affected by quite different properties of the strata encountered and, besides, will indicate different types of results due to their different nature. Various frequencies may, of course, be used, and as will be evident from the above description of Figure 1, the constant frequency oscillator 56 may be replaced by a low frequency alternating current or direct current logging arrangement.

Cooperating with the variable frequency oscillator 60 is a constant frequency oscillator 64 which may, for example, be crystal controlled.

The frequencies of the two oscillators should be sufficiently close so that for normal variations of frequency of the oscillator 60 the beat frequency will lie within a suitable audio range to be readily amplified. Output currents from the two oscillators are fed to the mixer 66, which delivers a beat frequency varying with the frequency variations of the oscillator 60. This beat frequency is fed to an automatic volume control amplifier indicated at 68, which in turn delivers a current having variable audio frequency but constant amplitude over the audio frequency range which is used. The output of the automatic volume control is fed to a modulator 70 which is also fed by the output of the constant frequency oscillator 56. The output of this modulator will then be a carrier of variable amplitude modulated at various audio frequencies, the variable amplitude being dependent solely on the operation of the oscillator 56 and the variable audio frequency being dependent solely upon the operation of the oscillator 60. The output of this modulator is detected by a suitable detector 72 and fed to an audio amplifier 74. The audio amplifier in turn is arranged to feed an audio frequency meter 76 and an amplitude meter 78. The frequency meter 76 must be of such nature as to be independent of the amplitude of the current delivered to it. It may, for example, be of the type illustrated in said Pearson and Smith patent involving an automatic volume control arrangement and a suitable network having an attenuation dependent upon frequency. The amplitude meter 78, on the other hand, should give readings independent of frequency, i. e., it may be of thermocouple or hot wire type, or may involve rectification like the assembly 30, 32, etc. of Figure 1.

As a result the frequency meter 76 corresponds in its responses solely to the variations in operation of the oscillator 60, while the amplitude meter 78 responds solely to the variations in operation of the oscillator 56. These meters may be of any suitable recording type and consequently two records are obtained corresponding to the two logging methods which are used. A transmission line to the surface may be provided either before or after the audio amplifier 74 to transmit the audio frequency current. Since one of the connections may be made through the ground, a single conductor cable may thus be made available to carry both types of records. This same cable may also transmit from the surface direct current for operation of the apparatus within the hole. Correlation of the records, taking into account the fact that at any instant two strata having predetermined spacing are being explored, leads to information of a valuable nature due to the fact that a single material may affect the two logging arrangements substantially differently.

Instead of providing different frequencies by the oscillators 56 and 60, they may have substantially the same frequency. For example, the oscillator 60 may have a variable frequency about that of the oscillator 56. In such case, one of the coils, say 58, may be wound so as to have a quite small axial extent, for example, of the order of an inch or less, while the coil 62 may have an axial extent which is considerably greater, for example, of the order of one or more feet. In such case, the short coil will detect strata of thin type, while the coil 62 will be of an integrating nature and will take into account the average conditions through regions having dimensions of the order of its length. If the coil 62 is made quite large, furthermore, it will tend to give indications of the nature of the strata existing at greater distances from the hole. By comparison of the results obtained with such coils, and since results depending upon different frequencies will be eliminated, valid deductions may be made as to the presence of thick or thin strata, the conditions which may be local ones at the bore hole as compared with conditions at greater distances therefrom, etc.

Figure 5:
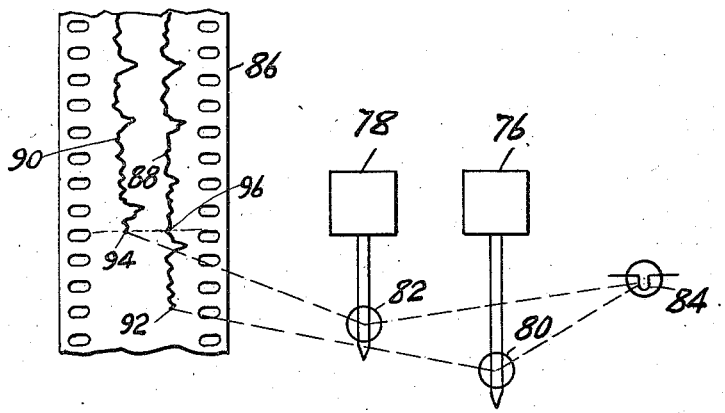
Figure 5 is a diagrammatic view of the type of recording apparatus preferably used with the assembly of Figure 4.

At a particular instant the coils 58 and 62 in any arrangement of the above type which is used will be indicating results derived at different levels. These coils must, of course, be spaced so that the currents in one do not influence the other. To avoid the necessity of reading a record taking into account this difference in position of the results, it is desirable to use a recording apparatus of the type illustrated in Figure 5, in which the frequency meter 76 is shown controlling an oscillograph mirror 80 and the amplitude meter 78 is shown as controlling the oscillograph mirror 82. A common lamp or a plurality of lamps 84 may be provided to project recording beams on a moving film 86 to form traces indicated at 88 and 90. The film 86 is desirably moved in synchronism with the cable on which the recording apparatus is lowered either by connecting the recording apparatus, if it is at the surface, with the cable length measuring devices or, if the recording is done in the hole, by lowering the cable at a constant speed, for example, under control of a synchronous motor while moving the recording film 86 within the apparatus by a clockwork mechanism at a uniform rate. In either case, the recording beams are caused to make their marks on the film at different longitudinal positions corresponding, taking into consideration the reduction of scale, to the difference in level of the coils 58 and 62. Thus, for example, the beam projected by the mirror 80 is producing a mark at a point 92, while that projected by a mirror 82 is producing a mark at 94. The points 92 and 94 are spaced longitudinally of the film to an extent corresponding to the difference in level of the exploratory coils. As a result, a point 96 on the record 88 having the same transverse position as the point 94 of the record 90 will correspond to effects at the same point in the hole. It will be evident that this facilitates the reading and interpretation of the record.

It will be obvious that various modifications of the arrangements disclosed fall within the scope of the invention as defined in the following claims.

What I claim and desire to protect by Letters Patent is:

1. Means for determining the location and character of strata penetrated by a bore hole comprising means for establishing electrical currents in formations in the vicinity of the bore hole varying in dependence upon the materials through which they flow, means for producing an audio frequency output of substantially constant amplitude, means receiving electrical currents from both said current establishing means and said audio frequency producing means and providing an audio frequency output varying in accordance with variations in said electrical currents in the formations, and means responsive to variations in said variable audio frequency output.

2. Means for determining the location and character of strata penetrated by a bore hole comprising means for establishing high frequency electrical currents in formations in the vicinity of the bore hole varying in dependence upon the materials through which they flow, means for producing an audio frequency output of substantially constant amplitude, means receiving both high and audio frequency currents from the foregoing means and providing an audio frequency ouput varying in accordance with variations in the high frequency currents in the formations, and means responsive to variations in said variable audio frequency output.

3. Means for determining the location and character of strata penetrated by a bore hole comprising means for establishing electrical currents in formations in the vicinity of the bore hole varying in dependence upon the materials through which they flow, means for producing an audio frequency output of substantially constant amplitude, means receiving electrical currents from both said current establishing means and said audio frequency producing means and providing an audio frequency output varying in accordance with variations in said electrical currents in the formations, means for amplifying said audio frequency output, and means responsive to variations in said variable audio frequency output.

4. Means for determining the location and character of strata penetrated by a bore hole comprising means for establishing high frequency electrical currents in formations in the vicinity of the bore hole varying in dependence upon the materials through which they flow, means for producing an audio frequency output of substantially constant amplitude, means receiving both high and audio frequency currents from the foregoing means and providing an audio frequency output varying in accordance with variations in the high frequency currents in the formations, means for amplifying said audio frequency output, and means responsive to variations in said variable audio frequency output.

5. Means for determining the location and character of strata penetrated by a bore hole comprising means for establishing an electromagnetic field penetrating formations in the vicinity of the bore hole, means for supporting the field establishing means for movement within and lengthwise of the bore hole, a generator of high frequency oscillations supplying said field establishing means, means for modulating at audio frequency the output of said generator, means for detecting the output of said generator, and means responsive to variations of the audio output of said detector to indicate the variations of the electromagnetic field in accordance with differences in materials penetrated thereby.

6. Means for determining the location and character of strata penetrated by a bore hole comprising means for establishing a plurality of independent electrical currents in formations in the vicinity of the bore hole varying in dependence upon the materials through which they flow, means for effecting variations in amplitude of an alternating current in accordance with variations of one of said plurality of electrical currents and for effecting variations in frequency of said alternating current in accordance with variations of another of said plurality of electrical currents, and means responsive to variations of both frequency and amplitude of said alternating current.

7. Means for determining the location and character of strata penetrated by a bore hole comprising means for establishing a plurality of independent high frequency electrical currents in formations in the vicinity of the bore hole varying in dependence upon the materials through which they flow, means for effecting variations in amplitude of an alternating current in accordance with variations of one of said plurality of electrical currents and for effecting variations in frequency of said alternating current in accordance with variations of another of said plurality of electrical currents, and means responsive to variations of both frequency and amplitude of said alternating current.

8. The method of determining the location and character of strata penetrated by a bore hole comprising providing by means of a logging apparatus a plurality of different responses of the strata to the presence of the logging apparatus, producing an alternating current, varying the amplitude of said alternating current in accordance with variations in one of said responses, and simultaneously varying the frequency of said alternating current in accordance with variations in another of said responses.

9. Means for determining the location and character of strata penetrated by a bore hole comprising means arranged to be located in a bore hole for establishing a plurality of independent electrical currents in formations in the vicinity of the bore hole varying in dependence upon the materials through which they flow, means for effecting variations in one characteristic of another electrical current, having frequencies different from those of said independent electrical currents, in accordance with variations of one of said plurality of electrical currents and for effecting variations of another characteristic thereof with variations of another of said plurality of electrical currents, and means responsive to variations of both of said characteristics of said doubly varied electrical current.

10. Means for determining the location and character of strata penetrated by a bore hole comprising means arranged to be located in a bore hole for establishing a plurality of independent high frequency electrical currents in formations in the vicinity of the bore hole varying in dependenece upon the materials through which they flow, means for effecting variations in one characteristic of another electrical current, having frequencies different from those of said independent electrical currents, in accordance with variations of one of said plurality of electrical currents and for effecting variations of another characteristic thereof with variations of another of said plurality of electrical currents, and means responsive to variations of both of said characteristics of said doubly varied electrical current.

11. Means for determining the location and character of strata penetrated by a bore hole comprising means arranged to be located in a bore hole for establishing a plurality of independent high frequency electrical currents in formations in the vicinity of the bore hole varying in dependence upon the materials through which they flow, means for transmitting simultaneously over a single transmission line low frequency signals of the variations of a plurality of said electrical currents, and means selectively responsive to said signals to indicate separately said variations.

12. The method of determining the location and character of strata penetrated by a bore hole comprising providing by means arranged to be located in the bore hole simultaneously, in strata penetrated by the bore hole and in the vicinity of said means, a plurality of high frequency electrical currents, electrically transmitting over a single path signals of the different responses of the strata to said currents, said signals having frequencies different from those of said high frequency electrical currents, and recording simultaneously the responses of the strata to said plurality of currents.

JOHN W. MILLINGTON.